(12) United States Patent
Kulzer

(10) Patent No.: US 7,392,785 B2
(45) Date of Patent: Jul. 1, 2008

(54) CONTROLLED SELF-IGNITION OF AN OTTO ENGINE BY SUPPORTING SPARK IGNITION

(75) Inventor: Andre-Francisco Casal Kulzer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/522,006

(22) Filed: Sep. 14, 2006

(65) Prior Publication Data

US 2007/0068466 A1 Mar. 29, 2007

(30) Foreign Application Priority Data

Sep. 14, 2005 (DE) .................. 10 2005 043 686

(51) Int. Cl.
*F02B 23/08* (2006.01)
*F02B 17/00* (2006.01)
*F02P 23/04* (2006.01)

(52) U.S. Cl. ................. 123/295; 123/294; 123/299; 123/300; 123/305

(58) Field of Classification Search .............. 123/3, 123/27 R, 294, 295, 299, 305, 435, 300
See application file for complete search history.

(56) References Cited

U.S. PATENT DOCUMENTS

| 6,213,086 B1 * | 4/2001 | Chmela et al. ............ 123/27 R |
| 6,260,520 B1 | 7/2001 | Van Reatherford ...... 123/48 AA |
| 6,293,246 B1 * | 9/2001 | Tanahashi et al. ........... 123/305 |
| 6,390,054 B1 | 5/2002 | Yang ......................... 123/295 |
| 6,971,365 B1 * | 12/2005 | Najt et al. ................... 123/305 |

FOREIGN PATENT DOCUMENTS

| DE | 199 27 479 | 12/1999 |
| WO | WO 98/10179 | 3/1998 |

* cited by examiner

Primary Examiner—T. M Argenbright
(74) Attorney, Agent, or Firm—Kenyon & Kenyon LLP

(57) ABSTRACT

A method for operating an internal combustion engine in controlled self-ignition, a fuel-air mixture being introduced into a combustion chamber at least partially in a gas-exchange cycle, and being compressed in a compression stroke, the load range usable for the Otto engine self-ignition is broadened in that, in the fuel-air mixture, during the gas-exchange cycle, a flame front is generated at one or a plurality of places by spark ignition, which compresses and/or heats up the remaining fuel-air mixture, and converts the latter thereby at least partially to intermediate combustion products.

13 Claims, 3 Drawing Sheets

CONTROLLED SELF-IGNITION OF AN OTTO ENGINE BY SUPPORTING SPARK IGNITION

FIELD OF THE INVENTION

The present invention relates to a method for operating an internal combustion engine in controlled self-ignition, a fuel-air mixture being introduced at least partially in a gas-exchange cycle in a combustion chamber, and being compressed in a compression stroke, as well as an internal combustion engine operating according to the method.

BACKGROUND INFORMATION

In direct injection gasoline internal combustion engines known from the related art, gasoline is injected directly into the combustion chamber of a cylinder of the internal combustion engine. The gasoline-air mixture compressed in the combustion chamber is then ignited by the ignition from an ignition spark in the combustion chamber. The volume of the ignited gasoline-air mixture expands explosively and sets in motion a piston that is able to move back and forth in the cylinder. The back and forth motion of the piston is transmitted to a crankshaft of the internal combustion engine.

Direct injection internal combustion engines are able to be operated in various operating modes. A so-called stratified operation is known as a first operating mode, which is used especially in response to smaller loads. A second operating mode known is a so-called homogeneous operation, which is used in response to greater loads on the internal combustion engine. The various operating modes differ especially in the start of injection and the injection period, as well as the point of ignition.

In stratified operation, the gasoline is injected into the combustion chamber during the compression phase of the internal combustion engine in such a way that, at the time of ignition, there is a fuel cloud in the immediate surroundings of a spark plug. This injection can proceed in different ways. Thus, it is possible that the injected fuel cloud is at the spark plug already during, or immediately after the injection, and is ignited by it. It is also possible that the injected fuel cloud is supplied to the spark plug by a charge movement, and is only then ignited. In the case of both combustion methods there is no uniform fuel distribution present in the combustion chamber, but rather a stratified charge.

An advantage of the stratified operation is that, using a very slight quantity of fuel, the smaller loads present are able to be carried out by the internal combustion engine. Greater loads, however, cannot be satisfied by stratified operation.

In the homogeneous operation used for greater loads, the gasoline is injected during the intake phase of the internal combustion engine, so that a swirl (voracity), and thereby a distribution, of the gasoline in the combustion chamber is able to take place even before ignition without a problem. To that extent, homogeneous operation corresponds approximately to the operating manner of internal combustion engines in which, in the usual way, fuel is injected into the intake pipe. If necessary, one may also use homogeneous operation for smaller loads.

In the operation of an internal combustion engine in the HCCI mode (homogeneous charge compression ignition), which is sometimes also designated as CAI (controlled auto ignition), ATAC (active thermo atmosphere combustion) or TS (Toyota Soken), the ignition of the air-fuel mixture does not take place by spark ignition, but by controlled self-ignition. The HCCI combustion process may be brought about, for instance, by a high proportion of hot residual gases and/or by a high compression and/or a high intake air temperature. A prerequisite for the self-ignition is a sufficiently high energy level in the cylinder. Internal combustion engines that are able to be operated in the HCCI mode are described in U.S. Pat. No. 6,260,520, U.S. Pat. No. 6,390,054, German Patent No. DE 199 27 479 and PCT International Patent Publication No. WO 98/10179.

By contrast to a usual combustion having spark ignition, the HCCI combustion has the advantage of reduced fuel usage and lower pollutant emission. To be sure, the regulation of the combustion process and especially the control of the self-ignition of the mixture is complex. Thus, what is needed is a regulation of the actuating variables that influence the combustion process for, for instance, the fuel injection (injection quantity and start and duration of injection) internal or external exhaust gas recirculation, intake valves and exhaust valves (variable valve control), exhaust gas back pressure (exhaust gas flap), possibly ignition support, intake air temperature, fuel quality and compression ratio in the case of internal combustion engines having variable compression ratios.

At this time, controlled self-ignition is only able to be used within narrow load ranges, since self-ignition is only driven by its kinetics of reaction, at present.

Therefore, the present invention is based on the object of widening the load ranges that are usable for Otto engine self-ignition.

SUMMARY OF THE INVENTION

This object is attained by a method for operating an internal combustion engine in controlled self-ignition, a fuel-air mixture being introduced into a combustion chamber at least partially in a gas-exchange cycle, and being compressed in a compression stroke, in the fuel-air mixture, during the gas-exchange cycle, a flame front being generated at one or more places by spark ignition, which compresses and/or heats up the remaining fuel-air mixture; and the latter being converted thereby at least partially to intermediate combustion products. The present invention makes possible the control and regulation of the self-ignition at different load points, with the aid of a stratified injection in combination with spark ignition. Using the ignition of a certain quantity of a stratified injection, it becomes possible, by flame propagation, to promote self-ignition of the remainder of the mixture, and thereby to control or regulate this combined combustion (flame propagation+self-ignition). With the aid of a stratified injection, the combustion is able to be influenced even late in the compression stroke and about the ignition TDC, by contrast to conventional self-ignition, in which, as of the closing of the intake-gas exchange valve, the combustion is determined only by the reaction kinetics. At different load points, different gas exchange valve strategies and injection strategies are required. In addition, supercharging can be used to broaden the characteristics map range, for instance, to cover higher loads. Because of the control or regulation of a stratified injection in the ignition TDC-near range, a hot stratified flame front is able to be started which is able to drive rapidly the remaining part into self-ignition. This stratified injection is able to be used as a control variable or as a regulating variable. In this context, it is preferably provided that the flame front is generated by one or more spark plugs and/or by a laser.

In one further refinement it is provided that a part of the fuel-air mixture is ignited by spark ignition during the compression stroke.

The fuel-air mixture preferably includes additional exhaust gas, as a fuel-air exhaust gas mixture, the exhaust gas preferably remaining in the combustion chamber because of a negative valve overlap (residual exhaust gas retention) in the gas-exchange cycle. In the case of a negative valve overlap, the exhaust gas exchange valve is closed before reaching the top dead center, so that a part of the combusted gases remain in the cylinder.

The problem set forth above is also solved by an internal combustion engine having an operating mode of controlled self-ignition, a fuel-air mixture being able to be introduced into a combustion chamber and being able to be compressed in a compression phase and ignited; a flame front being able to be generated in the fuel-air mixture, at one or more places, by spark ignition, the flame front being able to compress and/or heat up the remaining fuel-air mixture, and thereby trigger the self-ignition.

DETAILED DESCRIPTION

Figure 1:
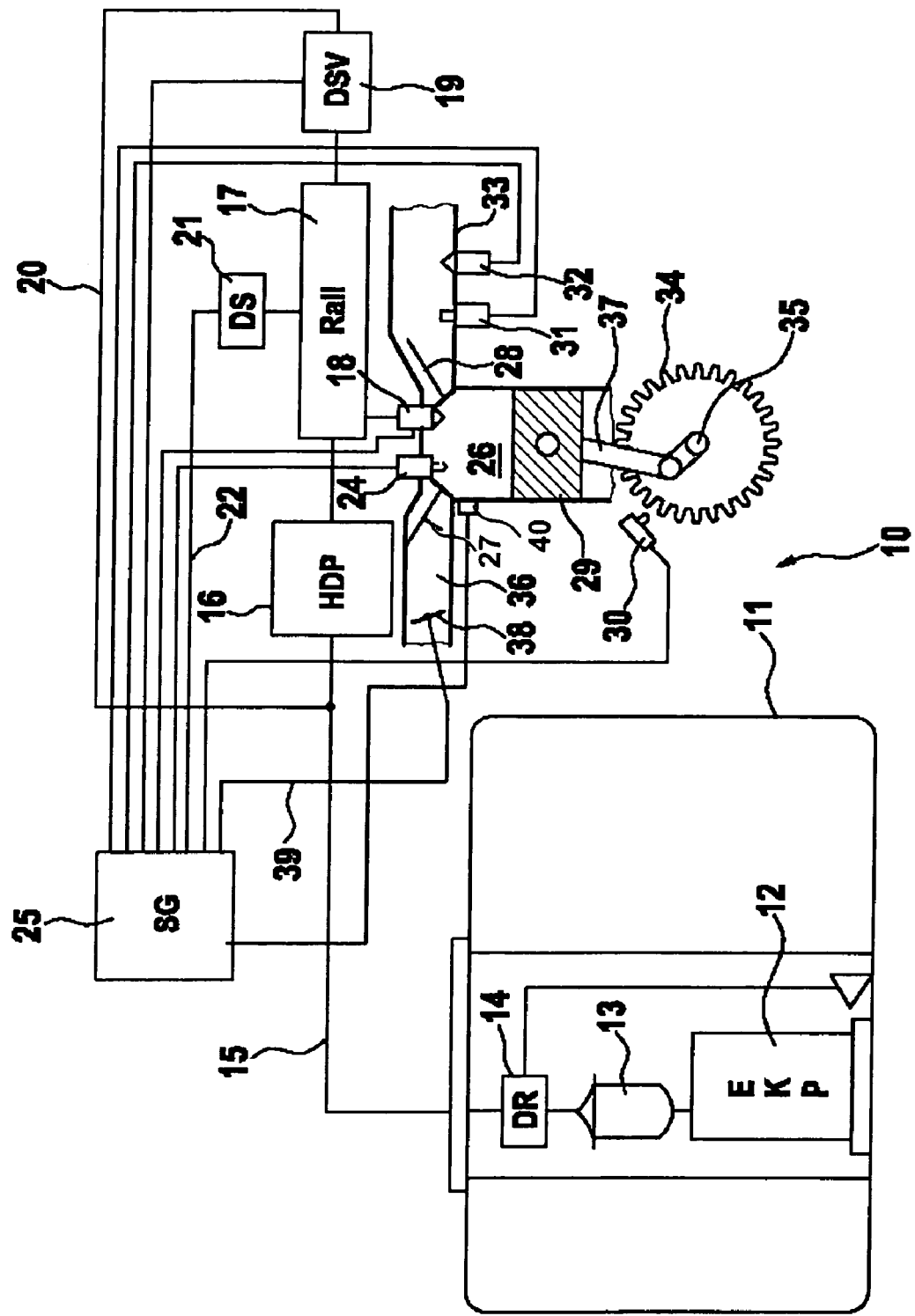
FIG. 1 shows a schematic representation of a cylinder of an internal combustion engine having a fuel supply system.

FIG. 1 shows a schematic representation of a cylinder of an internal combustion engine having appertaining components of the fuel supply system. Shown in exemplary form is an internal combustion engine having direct injection (Otto engine using direct gasoline injection BDE) having a fuel tank 11 at which an electric fuel pump (EKP) 12, a fuel filter 13 and a low pressure controller 14 are situated. From fuel tank 11, a fuel line 15 goes to a high pressure pump 16. A storage space 17 follows high pressure pump 16. Fuel injectors 18 are situated at storage space 17, which are preferably directly assigned to combustion chambers 26 of the internal combustion engine. In the case of internal combustion engines having direct injection, at least one fuel injector 18 is allotted to each combustion chamber 26, but, in this instance, a plurality of fuel injectors 18 may also be provided for each combustion chamber 26. The fuel is conveyed by electric fuel pump 12 from fuel tank 11, via fuel filter 13 and fuel line 15 to high pressure pump 16. It is the task of fuel filter 13 to remove foreign particles from the fuel. With the aid of low pressure controller 14, the fuel pressure is regulated in a low pressure range of the fuel supply system to a predetermined value, which is mostly of an order of magnitude of about 4 to 5 bar. High pressure pump 16, which is preferably driven directly by the internal combustion engine, compresses the fuel and conveys it to storage space 17. In this connection, the fuel pressure attains values of up to about 150 bar. FIG. 1 shows a combustion chamber 26 of an internal combustion engine having direct injection, and in general, the internal combustion engine has a plurality of cylinders having one combustion chamber 26 each. At combustion chamber 26, there is situated at least one fuel injector 18, at least one spark plug 24, at least one intake valve 27, at least one exhaust valve 28. The combustion chamber is bounded by a piston 29, which is able to slide up and down in the cylinder. Fresh air is sucked into combustion chamber 26 from an intake tract 36 via intake valve 27. The fuel is injected directly into combustion chamber 26 of the internal combustion engine with the aid of fuel injector 18. The fuel is ignited using spark plug 24. The expansion of the ignited fuel drives piston 29. The motion of piston 29 is transmitted to crankshaft 35 via a connecting rod 37. A segment disk 34 is situated on crankshaft 35, and it is scanned by a rotary speed sensor. Rotary speed sensor 30 generates a signal which characterizes the rotary motion of crankshaft 35.

An additional ignition device 40 may be situated at the combustion chamber. What may be involved here is an additional spark plug, in addition to spark plug 24, or, for example, a laser or the like. The spark ignition for bringing on the self-ignition, that is described below, is triggered by additional ignition device 40 or by spark plug 24.

Additional ignition device 40 is controlled by control unit 25, and is electrically connected to it for this purpose.

The exhaust gases created during combustion proceed via exhaust valve 28 out of combustion chamber 26 to an exhaust pipe 33, in which a temperature sensor 31 and a lambda probe 32 are situated. The temperature is recorded with the aid of temperature sensor 31, and the oxygen content of the exhaust gases is recorded with the aid of lambda probe 32.

A pressure sensor 21 and a pressure control valve 19 are connected to storage space 17. Pressure control valve 19 is connected to storage space 17 on its input side. On the output side, a return line 20 goes to fuel line 15.

Instead of a pressure control valve 19, a control valve of injected fuel quantity may also find application in fuel supply system 10. With the aid of pressure sensor 21, the actual value of the fuel pressure in storage space 17 is recorded and supplied to a control unit 25. Based on the recorded actual value of the fuel pressure, a control signal is formed, by control unit 25, by which the pressure control valve is activated. Fuel injectors 18 are activated by electrical output stages (not shown) which are able to be situated within or outside control unit 25. The various actuators and sensors are connected to control unit 25 via control signal lines 22. Various functions that are used for controlling the internal combustion engines are implemented in control unit 25. In modern control units, these functions are programmed on a computer, and are subsequently stored in a memory of control unit 25. The functions stored in the memory are activated as a function of the requirements on the internal combustion engine, and, in this connection, particularly strict requirements are set on the real time capability of control unit 25. In principle, a pure hardware implementation of the control of the internal combustion engine is possible as an alternative to a software implementation.

In intake tract 36 there is a throttle valve 38, whose rotary setting is adjustable via a signal line 39 and an appertaining electrical actuator, not shown here, by control unit 25.

In a first mode of operation, the homogeneous operation of internal combustion engine, throttle valve 38 is partially opened or closed as a function of the desired air mass that is to be supplied. Fuel is injected by fuel injector 18 into combustion chamber 26 during an intake phase produced by piston 29. Because of the air that is sucked in at the same time, the injected fuel is swirled, and is thereby distributed in combustion chamber 26, essentially in a uniform/homogeneous manner. Thereafter, the fuel-air mixture is compressed during the compression stroke, in which the volume of combustion chamber 26 is decreased by piston 29, in order then to be ignited, as a rule shortly before reaching the top dead center of piston 29.

In a second mode of operation, the stratified operation of the internal combustion engine, throttle valve 38 is opened wide. During the compression stroke brought about by piston 29, the fuel is injected into combustion chamber 26 by fuel injector 18. The fuel is then ignited as before, with the aid of spark plug 24, so that, in the subsequent working phase, piston 29 is driven by the expansion of the ignited fuel. An additional possible mode of operation is homogeneous lean operation, in which fuel is injected into combustion chamber 26 as in homogeneous operation, during the intake phase.

Figure 2:
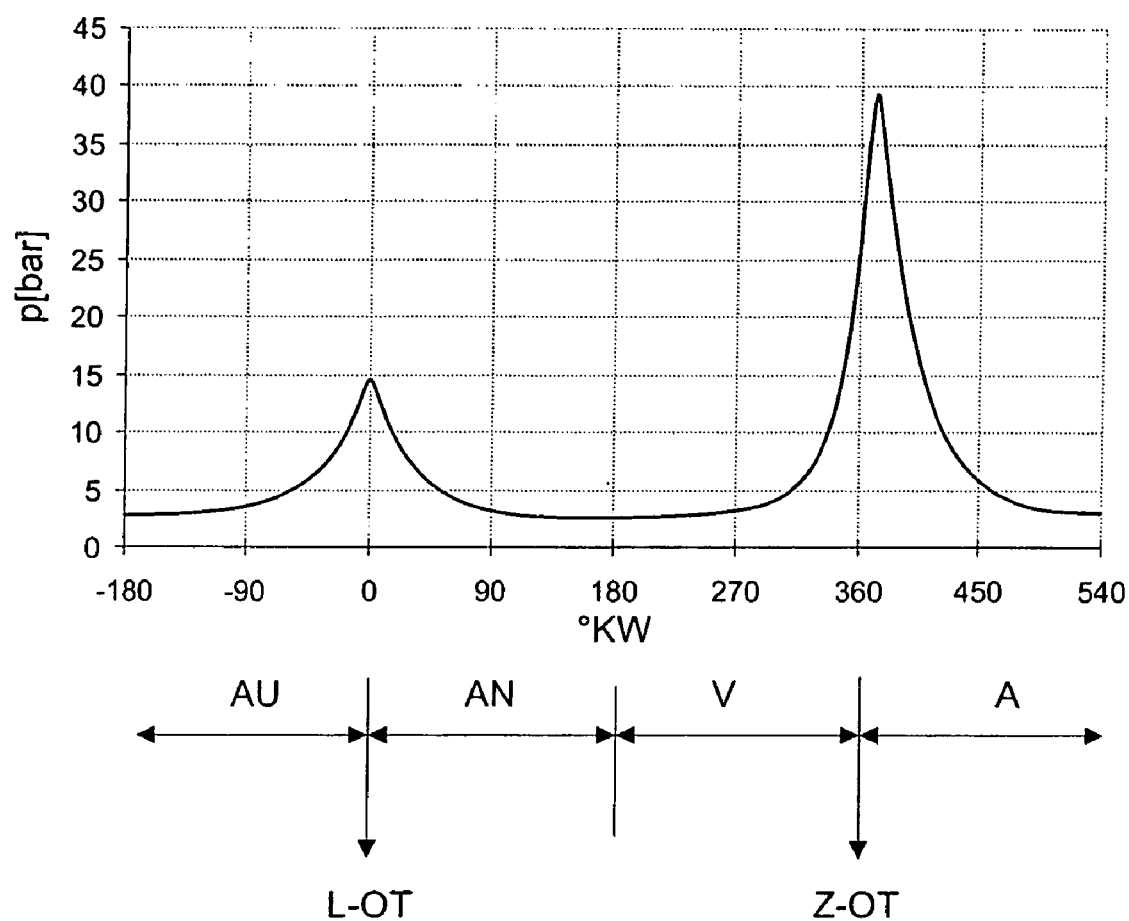
FIG. 2 shows a plot of combustion chamber pressure against crankshaft angle.

FIG. 2 shows a diagram of the combustion chamber pressure in combustion chamber 26 of the internal combustion engine plotted against the crankshaft angle (rotation) in degrees crankshaft (°KW). It shows a crankshaft angle of 180° to 540° over the ordinate, and the combustion chamber pressure in bar is plotted over the abscissa. The top dead center in the gas-exchange process, L-TDC, is arbitrarily picked as 0°. The gas-exchange process is used in a known manner for exhausting combusted exhaust gases, and this takes place, in this instance, between −180° and 0° crankshaft, and for sucking in fresh environmental air and a fuel-air mixture, which takes place, in this instance, in a crankshaft angle range of 0-180°. One crankshaft revolution further on, at 360° crankshaft, the top dead center of the ignition (ignition TDC) has been reached. Between 180° crankshaft angle in FIG. 2 and 360° crankshaft angle the compression stroke takes place, and between 360° crankshaft angle and 540° crankshaft angle the expansion of the combusting gases takes place. The individual periods are designated in FIG. 2 by exhausting AU from −180° to 0°, sucking in AN from 0° to 180°, compression stroke (compression) V from 180° to 360° and expansion (combustion) E from 360° to 540°. In compression period V the air mixture or the fuel-air mixture or the fuel-air exhaust gas mixture is compressed and heated up thereby. The mixture is ignited, as a rule, shortly before reaching the ignition TDC. This is able to take place, as is customary in an Otto engine, by spark ignition or, according to the operating mode according to the present invention by a controlled self-ignition. The ignition of the mixture leads in a known way to a pressure increase, which is converted in the subsequent work period of expansion E into mechanical energy.

In a directly injecting gasoline engine, the fuel may, on the one hand, be injected partially during the compression phase V (see FIG. 2) in stratified operation, and on the other hand, it may be injected as in a usual Otto engine, at least partially after the charge exchange process TDC L-TDC in homogeneous operation into the combustion chamber and the intake channel. In this context, the complete fuel quantity to be injected in the power cycle is able to be injected (homogeneous mixed operation) during the intake stroke or only a part thereof, the remaining part then being injected during the compression stroke. In the operating mode of the controlled self-ignition, the self-ignition takes place shortly before the ignition TDC Z-TDC is reached. For this, it is required that the gas-air-fuel-exhaust gas mixture has a sufficient ignition temperature. This cannot be guaranteed in all operating states. In order to increase the temperature of the fuel-air-exhaust gas mixture in combustion chamber 26, at least a part of the required fuel quantity is introduced into combustion chamber 26 during the intake stroke, and is at least partially ignited by spark ignition. This increases the temperature of the fuel-air-exhaust gas mixture in combustion chamber 26. Based on the fuel concentration and the pressure ratios, the spark ignition generates an only slowly progressing flame front, which further compresses the remaining fuel-air-exhaust gas mixture and increases its temperature. In the fuel-air-exhaust gas mixture not ignited by the flame front, a pressure and a temperature are generated thereby which is sufficient for the partial conversion into intermediate combustion products. In this context, heat is generated, the energy conversion being less than in response to complete combustion. After intake stroke AN, the fuel-air-exhaust gas mixture that is located in combustion chamber 26 enters compression stroke V at an increased temperature. The temperature level is therefore already increased for the subsequent compression stroke by the at least partially combusted and converted fuel quantity, so that the temperature and pressure are sufficient for triggering a controlled self-ignition during the compression stroke. In addition, a further spark ignition is able to take place during the compression stroke, which is then first followed by the controlled self-ignition.

Based on the fuel concentration and the pressure ratios, the spark ignition during compression stroke V generates an only slowly progressing flame front, which further compresses the remaining fuel-air-exhaust gas mixture and increases its temperature. In the fuel-air-exhaust gas mixture not ignited by the flame front, a pressure and a temperature are generated thereby which are sufficient for the self-ignition. Thus, the self-ignition is generated by a pressure increase and a temperature increase in combustion chamber 26, which is brought about using a spark ignition.

Figure 3:
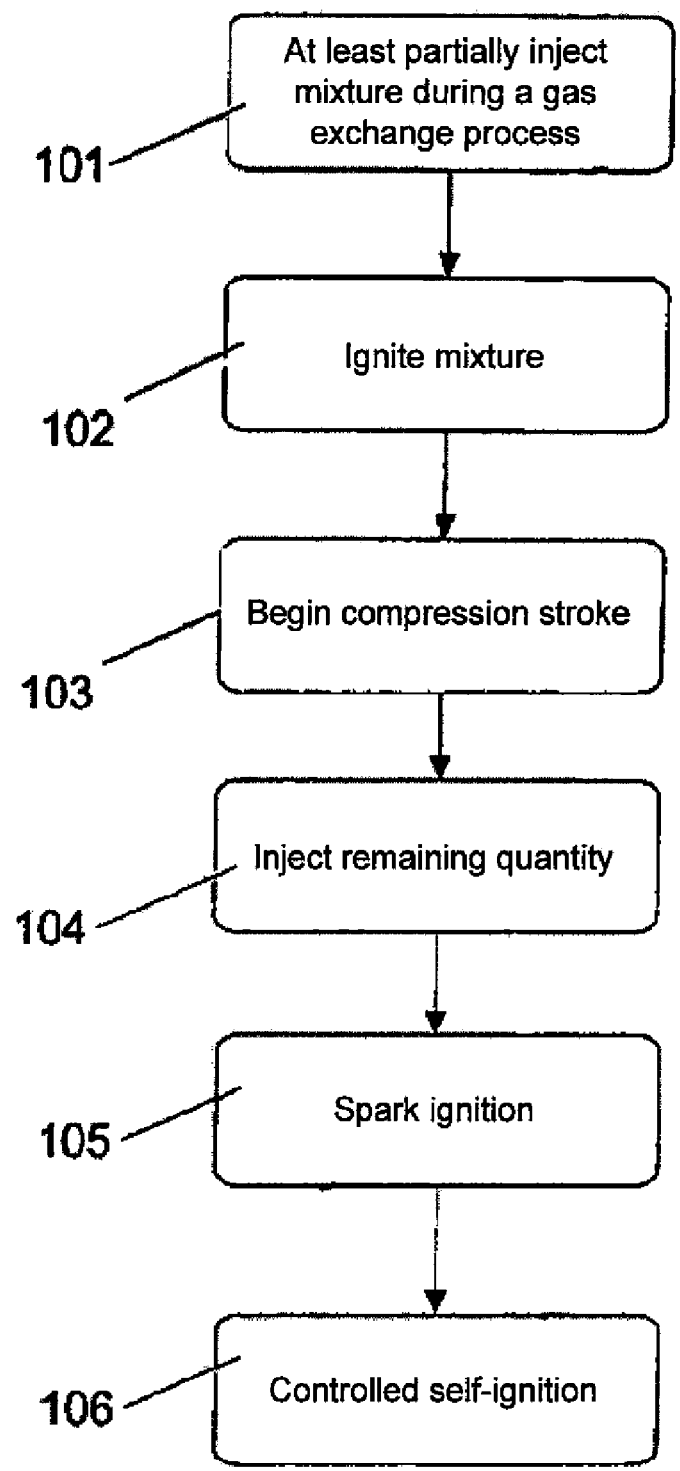
FIG. 3 shows a flow chart of the method.

FIG. 3 shows a flowchart of the method according to the present invention. In step 101 at least a part of the injection quantity provided for the power cycle is first of all injected in the charge exchange cycle, that is in exhaust stroke AU, intake stroke AN or in the remaining gas compression phase. The remaining gas compression phase is the part of the exhaust stroke in which, in response to a closed exhaust valve and a closed intake valve (negative valve overlap) the rest of the exhaust gas in the combustion chamber is compressed. There then follows optionally, in step 102, the ignition of the fuel-air-exhaust gas mixture injected in step 101. The compression stroke then follows in step 103, and in step 104 the remainder of the quantity is injected. The injection quantity in steps 101 and 104 is the fuel quantity used for the entire power cycle. In step 106, a part of the fuel-air-exhaust gas mixture is ignited in combustion chamber 26 by spark ignition, whereby a slowly progressing flame front is created which brings the remaining mixture to controlled self-ignition in step 105. The controlled self-ignition then follows in step 106. It is also possible only to inject fuel during the intake stroke, and to ignite this by spark ignition either directly partially in step 102, or to ignite this partially by spark ignition in step 105 during the compression stroke, whereupon the controlled self-ignition is triggered in step 106.

What is claimed is:

1. A method for operating an internal combustion engine in controlled self-ignition, the method comprising:
   introducing a fuel-air mixture into a combustion chamber at least partially in a gas-exchange cycle;
   compressing the fuel-air mixture in a compression stroke; and
   in the fuel-air mixture, during the gas-exchange cycle, generating a flame front at at least one place by spark ignition, which at least one of compresses and heats up a remaining fuel-air mixture, and converts the remaining fuel-air mixture at least partially to intenriediate combustion products.

2. The method according to claim 1, wherein the flame front is generated by at least one spark plug.

3. The method according to claim 1, wherein the flame front is generated by a laser.

4. The method according to claim 1, further comprising igniting a part of the fuel-air mixture by spark ignition during the compression stroke.

5. The method according to claim 1, wherein the fuel-air mixture additionally contains exhaust gas as a fuel-air-exhaust gas mixture.

6. The method according to claim 5, wherein The exhaust gas remains in the combustion chamber because of a negative valve overlap in the gas-exchange cycle.

7. An internal combustion engine having an operating mode of controlled self-ignition, comprising:
- an arrangement for introducing a fuel-air mixture into a combustion chamber;
- an arrangement for compressing the fuel-air mixture in a compression phase;
- an arrangement for igniting the fuel-air mixture; and
- an arrangement for, during a gas-exchange cycle, generating a flame front in the fuel-air mixture, at at least one place, by spark ignition, which is able to at least one of compress and heat up a remaining fuel-air mixture, and is able to trigger the self-ignition.

8. The internal combustion engine of claim 7, wherein the arrangement for generating the flame front includes at least one spark plug.

9. The internal combustion engine of claim 7, wherein the arrangement for generating the flame front includes a laser.

10. The internal combustion engine of claim 7, wherein a part of the fuel-air mixture is ignited by spark ignition during the compression phase.

11. The internal combustion engine of claim 7, wherein the fuel-air mixture additionally contains exhaust gas as a fuel-air-exhaust gas mixture.

12. The internal combustion engine of claim 11, wherein the exhaust gas remains in the combustion chamber because of a negative valve overlap in the gas-exchange cycle.

13. The internal combustion engine of claim 7, wherein the fuel-air mixture is introduced at least partially into the combustion chamber in the gas-exchange cycle.

* * * * *